(12) United States Patent
Dean et al.

(10) Patent No.: US 7,379,013 B2
(45) Date of Patent: May 27, 2008

(54) DETECTING OBJECTS WITHIN A NEAR-FIELD OF A FREQUENCY MODULATED CONTINUOUS WAVE (FMCW) RADAR SYSTEM

(75) Inventors: Michael Dean, St. Paul, MN (US); Haozhe Dong, Plymouth, MN (US)

(73) Assignee: Banner Engineering Corporation, Minneapolis, MN (US)

( * ) Notice: Subject to any disclaimer, the term of this patent is extended or adjusted under 35 U.S.C. 154(b) by 364 days.

(21) Appl. No.: 11/244,246

(22) Filed: Oct. 5, 2005

(65) Prior Publication Data
US 2007/0247352 A1   Oct. 25, 2007

(51) Int. Cl.
G01S 13/04   (2006.01)
(52) U.S. Cl. .................. 342/27; 342/85; 342/98; 342/128
(58) Field of Classification Search ........... 342/27
See application file for complete search history.

(56) References Cited

U.S. PATENT DOCUMENTS 5,670,886 A * 9/1997 Wolff et al. ............... 324/644
7,176,828 B2 * 2/2007 Tirkel et al. ............... 342/22
2003/0052811 A1 * 3/2003 Lawless ..................... 342/28

OTHER PUBLICATIONS

Giubbolini, Luigi. "A Multistatic Microwave Radar Sensor for Short Range Anticollision Warning". IEEE Transactions on Vehicular Technology. Nov. 2000. vol. 49, Issue 6. pp. 2270-2275.*

* cited by examiner

Primary Examiner—Thomas H. Tarcza
Assistant Examiner—Matthew M Barker
(74) Attorney, Agent, or Firm—Merchant & Gould P.C.

(57) ABSTRACT

The present disclosure relates to a radar device and technique for detecting the presence of objects located in the near-field of a frequency modulated, continuous wave (FMCW) radar device. The technique includes transmitting and receiving a frequency modulated signal, generating an intermediate frequency signal based on the transmitted and received signals, and analyzing the frequency content of the intermediate frequency signal. The frequency content of the intermediate signal is analyzed without filtering out a carrier signal.

25 Claims, 8 Drawing Sheets

DETECTING OBJECTS WITHIN A NEAR-FIELD OF A FREQUENCY MODULATED CONTINUOUS WAVE (FMCW) RADAR SYSTEM

TECHNICAL FIELD

The present invention relates to radar and, more particularly to detecting objects within the near-field of a frequency modulated continuous wave (FMCW) radar system.

BACKGROUND

Radar is the technique of using radio waves to detect the existence of an object and then to find the object's position in relation to a known point. Air traffic control uses radar to track planes both on the ground and in the air, and also to guide planes in for smooth landings. Police use radar to detect the speed of passing motorists. The military uses it to detect an enemy and to guide weapons. NASA uses radar to map the Earth and other planets, to track satellites and space debris, and to help with docking and maneuvering of spacecrafts.

Radar systems typically operate by emitting, for example, microwave energy from a transmitting antenna in the form of a focused beam with known divergence angles. Some of this emitted microwave energy is reflected off objects in the beam's path and collected by a receiving antenna. This emitted and reflected energy is minimally affected by environmental conditions, such as in rain, fog, clouds, or time of day.

Most radar equipment is pulse-modulated, i.e. the radiation from a transmitting antenna is in the form of very short bursts or pulses of radio frequency (RF) energy. Each pulse is followed by a relatively long resting period during which the transmitter is switched off and the receiver is operating. Pulsed radar is used for the observation of objects located great distances, such as an aircraft several hundreds of kilometers from a radar station.

Continuous wave (CW) is another type of radar. CW relies on the "Doppler shift" in frequency to detect moving objects and to measure their speed. This phenomenon, known as the Doppler effect, occurs with radio waves as well as with sound waves. As an object approaches a radar antenna, the frequency of the signal reflected by the object is higher than that of the transmitted signal. Conversely if an object is moving directly away from the antenna the frequency of the reflected signal is lower than that of the transmitted signal. For stationary objects there is no change in the frequency of the reflected signal.

An improvement to CW radar is frequency-modulated continuous wave (FMCW) radar. FMCW radar utilizes a frequency-modulated waveform that is continuously transmitted from and received by a radar station. In FMCW radar, the difference in frequency between an emitted wave from a transmitter and a reflected wave from the object is calculated at a receiver. The receiver then provides an indication of the range of the object. FMCW radar not only measures range or distance to the object, but also the object's speed. The FMCW radar is capable of both long ranges, in the tens of kilometers, as well as short ranges, in meters.

However, FMCW systems cannot range objects in a near-field. The near-field, when discussing radio wave propagation with respect to radar, is an area in the immediate vicinity of a radar system's antenna. More specifically, it is a non-distinguishable or non-sensing area close to the radar system in which objects distance cannot be determined. In contrast, the far-field is an area that is far enough from the antenna to be approximated as a plane wave. Exactly how far away the transition from near-field to far-field occurs is a function of the bandwidth of a frequency sweep, the geometry and size of the antenna, and the electromagnetic properties of the target.

The behavior of wave propagation in the near-field is different than it is in the far-field. When objects are in the near-field, an FMCW radar system cannot distinguish between objects and noise. Hence, a typical radar system filters the data and removes the near-field effects in this non-distinguishable or non-sensing range. Accordingly, FMCW radars are not useful for ranging or detecting objects in the near-field.

SUMMARY OF THE INVENTION

In general terms, the present disclosure relates to a system and method for proximity sensing, and more particularly to a system and method for detecting objects in a near-field using frequency-modulated continuous wave radar.

One aspect of the present invention is a method for detecting an object in the near-field of a frequency modulated continuous wave radar system. The method includes transmitting a modulated signal from a first antenna, receiving the modulated signal at a second antenna, the second antenna being in close proximity to the first antenna, generating an intermediate signal based on a difference in frequency between the transmitted modulated signal and the received modulated signal, and comparing an amplitude of the intermediate signal with an amplitude of a predetermined intermediate signal for detecting an object in a near-field.

Another aspect of the present invention is directed to a frequency modulated continuous wave radar module for detecting objects in the near-field. The system includes a first antenna for transmitting a modulated signal, a second antenna for receiving the modulated signal, the second antenna being in close proximity to the first antenna, at least one mixer coupled to the first and second antennas for generating an intermediate signal based on a difference in frequency between the transmitted modulated signal and the received modulated signal, and a processor coupled to the mixer for comparing an amplitude of the intermediate signal with an amplitude of a predetermined intermediate signal for detecting an object in a near-field.

Yet another aspect of the present invention is a proximity sensor for use in detecting objects in a near-field. The sensor includes a housing and a circuit enclosed within the housing, the circuit including a first antenna for transmitting a modulated signal, a second antenna for receiving the modulated signal, the second antenna being in close proximity to the first antenna, at least one mixer coupled to the first and second antennas for generating an intermediate signal based on a difference in frequency between the transmitted modulated signal and the received modulated signal, and a processor coupled to the mixer for comparing an amplitude of the intermediate signal with an amplitude of a predetermined intermediate signal for detecting an object in a near-field.

BRIEF DESCRIPTION OF THE DRAWINGS

The invention may be more completely understood by considering the detailed description of various embodiments of the invention which follows in connection with the accompanying drawings. Referring now to the drawings in which like reference numbers represent corresponding parts throughout.

DETAILED DESCRIPTION OF THE PREFERRED EMBODIMENT

Figure 1:
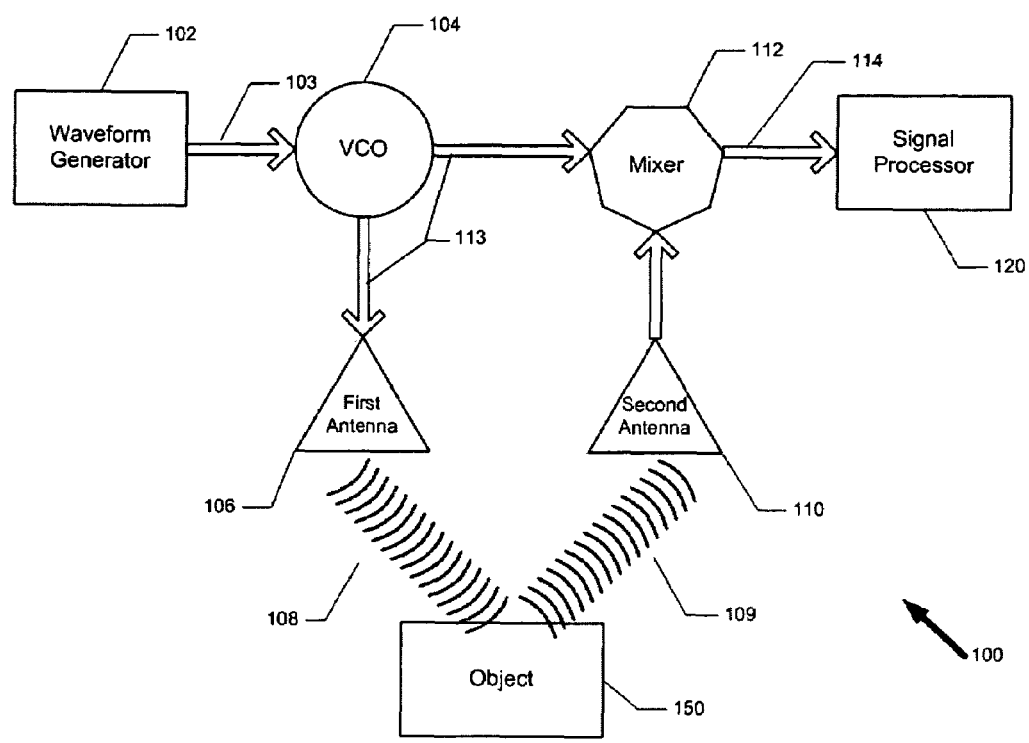
FIG. 1 is an illustration of a FMCW radar system according to one possible embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

FIG. 1 is an illustration of a FMCW radar system 100 according to one possible embodiment of the present disclosure. The FMCW radar system includes a waveform generator 102 coupled to a voltage-controlled oscillator (VCO) 104. The waveform generator 102 provides a periodic input signal 103, variable with an applied voltage, to a desired repeating carrier waveform of the VCO 104. The system also includes a transmitting antenna 106, a receiving antenna 110, one or more amplifiers, one or more mixers 112 and a signal processor 120.

The VCO 104 is an electronic oscillator circuit whose clock frequency is determined by the magnitude of the voltage presented at its input, i.e., the frequency changes when the voltage changes. Accordingly, the VCO 104 is used to generate an output signal 113, the frequency of which depends on the input voltage of the waveform generator 102. Generally, the frequency of the output signal 113 of the VCO 104 is in the Gigahertz range. In one possible embodiment, the frequency of the VCO 104 varies between 24 and 24.25 GHz.

The waveform generator 102 generates the periodic input signal 103 according to a desired waveform. The VCO 104 is subjected to this periodic waveform, such as a sawtooth or triangular waveform in the KHz range, which produces swept microwave emission at the transmitting antenna 106. However, the embodiment is not limited to these waveforms, and any suitable waveform can be used, such as sinusoidal, square wave or the like. In one possible embodiment, the voltage of the periodic input signal 103 varies between 0V and 10V. The frequency, or repetition per unit of time, of the VCO 104 modulated output signal 113 varies in proportion to the periodic input signal 103 from the waveform generator 102.

Microwave energy leaves the transmitting antenna 106 in the form of a focused beam 108 having known divergence angles, i.e., spreading out of microwave energy 108 as measured by the angle from the center axis of the emitted microwave energy 108. Some of this emitted microwave energy 108 is reflected off of an object 150 and is collected in the receive antenna 110 as a received signal 109. In one possible embodiment, object 150 includes metal structures, people, and animals. However, object 150 is not limited to these elements and can include any other structures that can reflect the transmitted signal 108, such as wood, fabric, glass, rock and the like.

The mixer 112 takes a portion of the output signal 113 and mixes it with the received signal 109 to produce a difference frequency, called the intermediate frequency (IF) 114. The intermediate frequency (IF) 114 is proportional to the distance of the object from the radar system 100 according to the following equation:

$$R = C\, T f_I / (2F) \quad (1)$$

where R is the distance to the object, C is the speed of light, $f_I$ is the intermediate frequency, T is the period of the VCO input and F is the microwave frequency sweep.

In the embodiment of FIG. 1, the periodic input signal 103 transmitted to the VCO 104 producing the output signal 113, is propagated through the mixer 112 and can be detected in the intermediate frequency output signal 114 due to crosstalk. This intermediate frequency output signal 114 has a variable amplitude depending on whether or not an object 150 is detected. This phenomenon is discussed in more detail along with the following diagrams.

Figure 2:
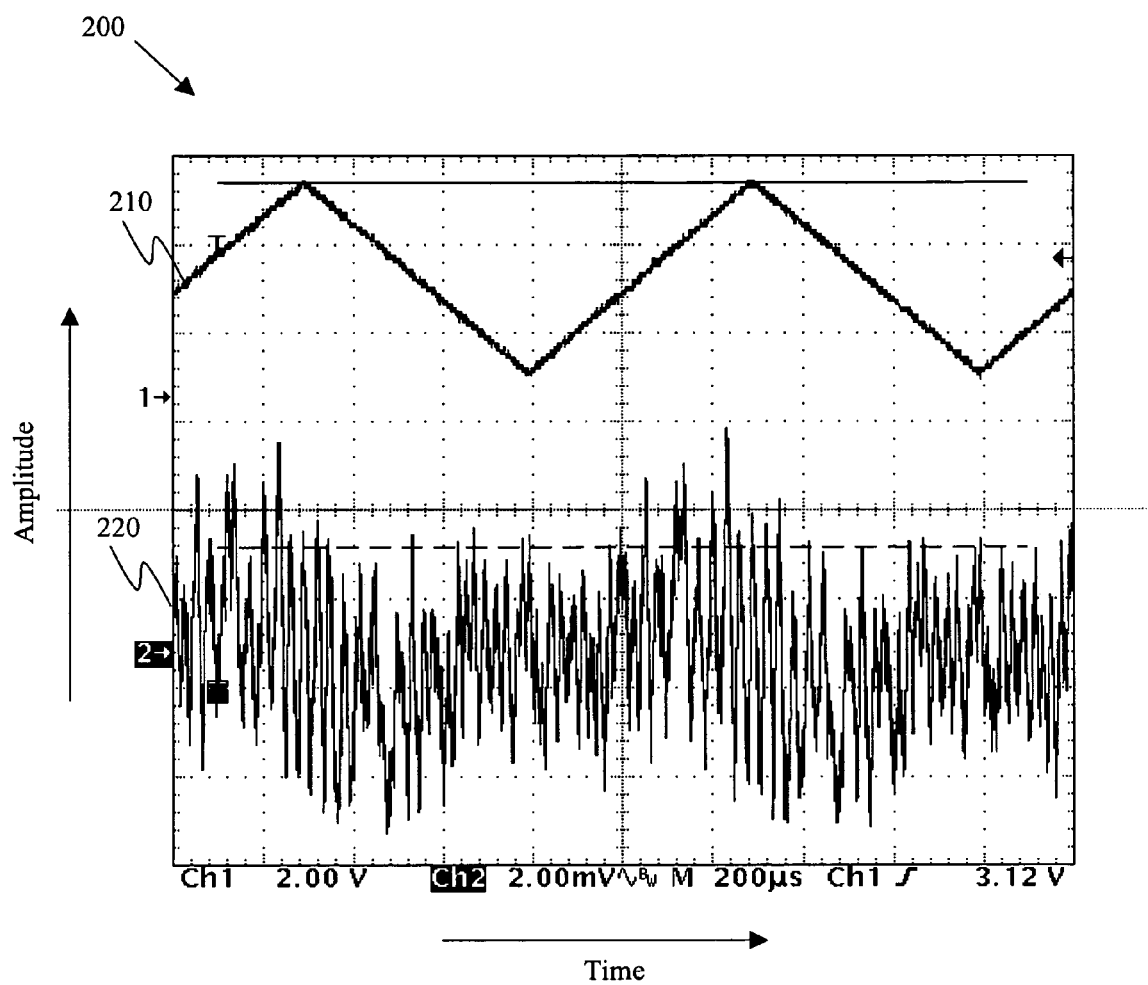
FIG. 2 is an illustration of oscilloscope traces including an oscillator input signal and an intermediate frequency output signal as described in FIG. 1.

FIG. 2 is an illustration of oscilloscope traces 200 including an oscillator input signal and an intermediate frequency output signal as described in FIG. 1. In FIG. 2, an oscilloscope displays a trace of a periodic oscillator input signal 210 (input signal) to a VCO and an intermediate frequency output signal 220 according to one possible embodiment. The amplitude of each signal 210, 220 is plotted as a function of time. The amplitude can be measured in units of volts, however, the invention is not limited to this unit of measurement and any suitable unit may be used, such as current. According to this embodiment, the oscillator input signal 210 is a triangle wave. However, the invention is not limited to the triangular waveform, and any suitable waveform can be used, such as sinusoidal, square or sawtooth waveform and the like. Due to crosstalk, it is possible to find traces of the oscillator input signal 210 in the intermediate frequency output signal 220.

Typically, the VCO input signal 210 is filtered out of the intermediate frequency output signal 220 when the intermediate frequency output signal 220 is processed by a signal processor or the like. In this case, the practical limit for close range operation of FMCW radar is when the intermediate frequency output signal 220 is equal to the VCO input signal 210, in which case the equation above becomes $$R = C/(2F) \quad (2)$$

where R is the distance to the object, C is the speed of light and F is the microwave frequency sweep.

Accordingly, for example, radar operating with a frequency F equal to 200 MHz has a distance to the object R equal to 0.75 m. In this example, the distance R is referred to as the dead zone, or near-field. As discussed above, prior art FMCW radars cannot be used for ranging or detecting objects in the near-field.

Figure 3:
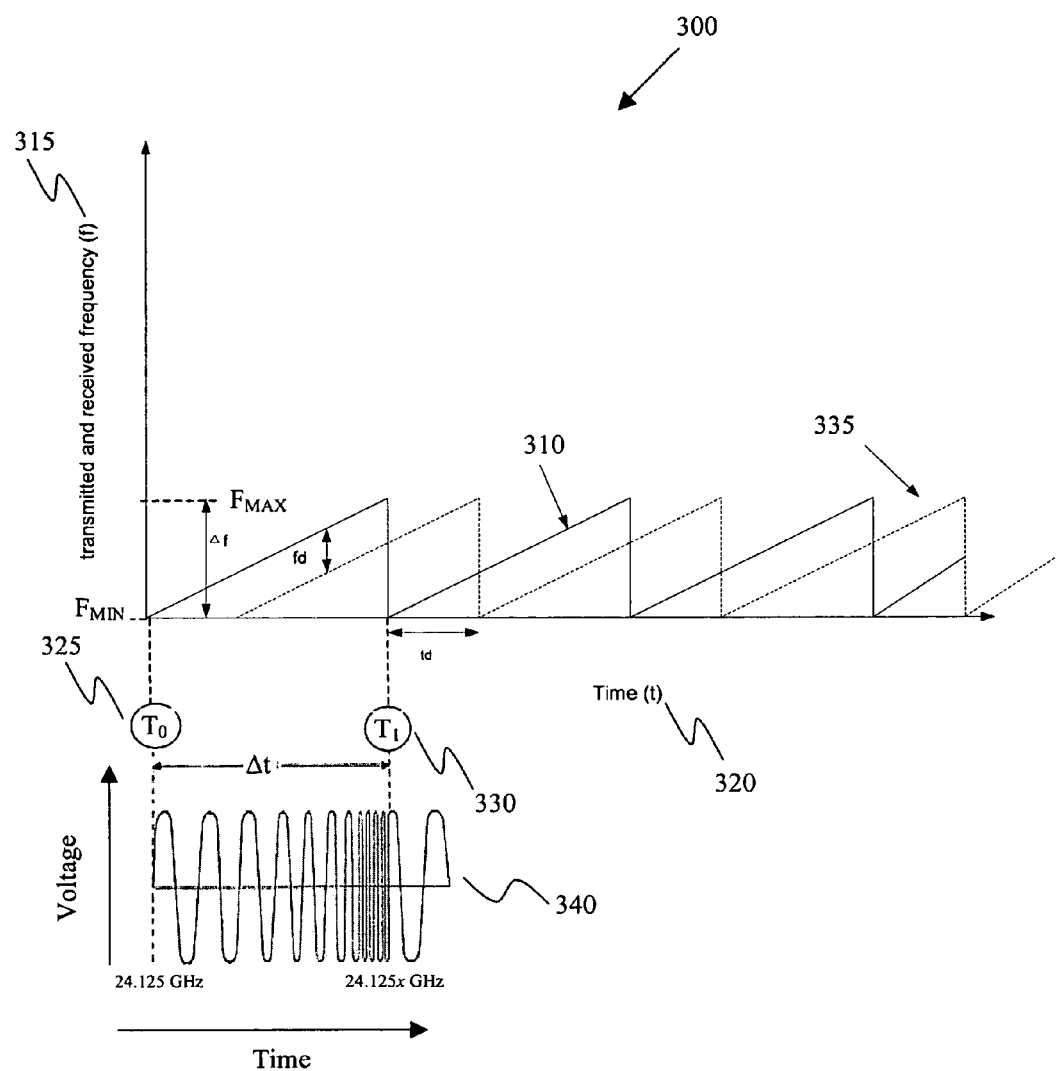
FIG. 3 is a graph illustrating the detection of objects with respect to the transmission and reception of FMCW radar signals according to one embodiment of the present disclosure.

FIG. 3 is a graph 300 illustrating the detection of objects with respect to the transmission and reception of FMCW radar signals according to one embodiment of the present disclosure. The FMCW radar system continuously transmits and receives electromagnetic (EM) waves, the frequency of which has been modulated according to a periodic waveform. The amount by which the frequency of the transmitted wave varies is often referred to as the frequency sweep. When the transmitted wave bounces off (e.g., echoes) an object and is received back at the radar system, the frequency of the received or incoming wave 335 will have shifted $t_d$ from the frequency of the transmitted outgoing wave 310.

More particularly, in a frequency modulated (FM) transmitter the carrier frequency changes at a rate determined by the frequency of the modulating signal and by an amount determined by the amplitude of the modulating signal. The transmitter works continuously and produces a constant-amplitude (CW) output whose frequency is varied by the modulating signal. For example, suppose that the transmitted frequency 310 of a FMCW radar transmitter deviates at a constant rate by using a sawtooth waveform as a modulating signal as illustrated in the frequency (f) 315 versus time (t) 320 graph 300. In one possible embodiment, at point $T_0$ 325, the carrier frequency is 24.125 GHz, for example. At point $T_1$ 330, some time later ($\Delta t$), the transmit frequency 310 has linearly increased to some frequency 24.125x above the center frequency 24.125 GHz as illustrated in the graph 340.

In the embodiment, the transmitted frequency 310 can be radiated out from a transmit antenna and reflected from an object to be received by a receive antenna as a received frequency 335. The transmit wave takes a definite time to travel over this path so that when it arrives back at the receiver antenna, the transmitter frequency has in the meantime changed. The reflected wave of course has its original frequency. In other words, because the frequency of the emitted signal varies over time, the frequency of the signal received at a time $T_1$ 330 will differ from the frequency of the signal being transmitted at time $T_0$ 325. In particular, the waveform representing the frequency change of the signal will have shifted along the time axis $t_d$.

As discussed above in the radar system of FIG. 1, a portion of the transmitted frequency 310 is fed directly to the receiver where it combines in the mixer (FIG. 1, 112) with the reflected input (i.e., received frequency 335) frequency to produce a difference frequency or intermediate frequency $f_d$. The greater the distance of the radar system from the object, the greater is the difference in frequency, or intermediate frequency $f_d$, between the transmitted frequency 310 and the received frequency 335. Also, the transmitted frequency 310 and the received frequency 335 signals can vary between a minimum frequency $F_{MIN}$ and a maximum frequency $F_{MAX}$. The range between $F_{MIN}$ and $F_{MAX}$ ($\Delta f$) is referred to as the frequency sweep F.

The transmitted frequency 310 wave shifts by an amount $t_d$ in the time it takes the transmitted wave to reflect off an object and be received at a receiving antenna. At any given time, the received frequency 335 differs from the transmitted frequency 310 of the emitted signal by an amount equal to the intermediate frequency $f_d$. According to one embodiment, the transmitted frequency 310 is being modulated by a sawtooth waveform. However, the invention is not limited to sawtooth modulated waveform and any suitable waveform can be used, such as a triangle waveform, a sinusoidal waveform or the like. Accordingly, the following formula is used to sense the distance between the radar system and the object using the intermediate frequency $f_d$:

$$R = C \, T f_d / (2F) \qquad (3)$$

where R is the distance to the object, C is the speed of light, T is the period of the carrier frequency, $f_d$ is an intermediate frequency signal, and F is the emitted frequency variation (i.e., frequency sweep). The following paragraphs will illustrate how the intermediate frequency signal can be used to detect the presence of objects in the near-field according to the present disclosure.

Figure 4:
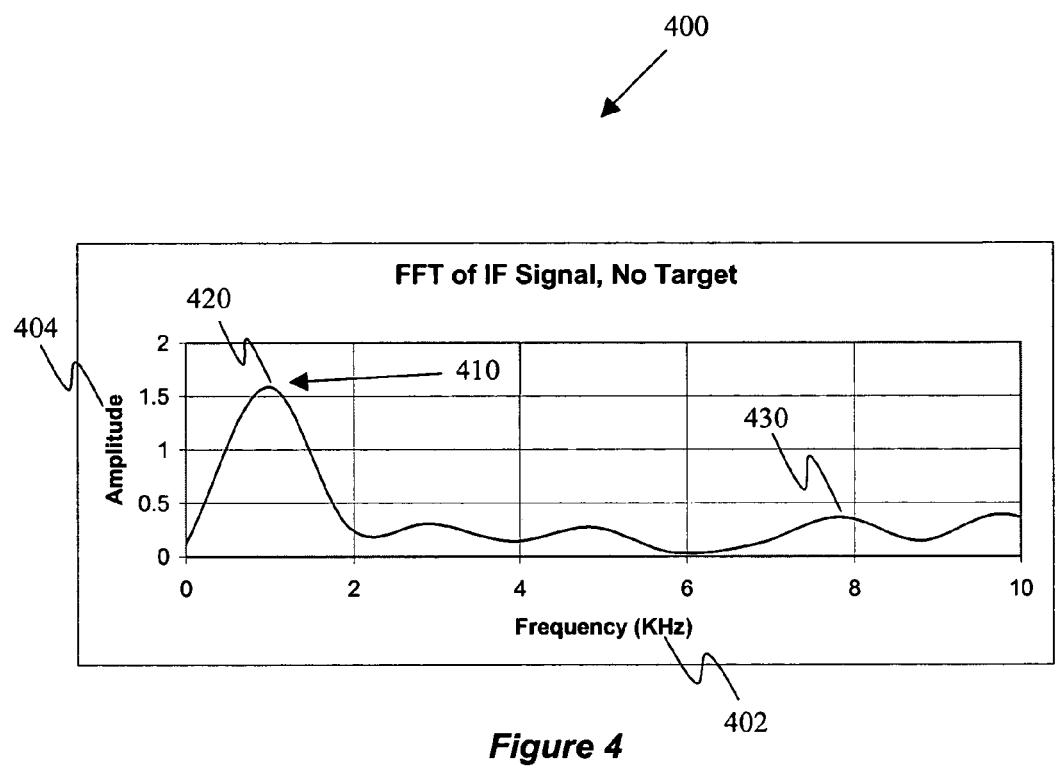
FIG. 4 is a graph illustrating one embodiment using an intermediate frequency to detect objects in the near-field of a radar system according to the present disclosure.

FIG. 4 is a graph 400 illustrating one embodiment using an intermediate frequency to detect objects in the near-field of a radar system according to the present disclosure. It is possible to detect the presence of objects in the near-field by analyzing the frequency content of the intermediate frequency signal 410. The graph 400 illustrates an intermediate frequency signal 410 in a frequency domain when no target is present. As it will be seen in the following drawings, the change in the intermediate frequency signal 410 is detectable using spectral analysis via Fast Fourier Transforms (FFT). However, the invention is not limited to the FFT and any suitable detector can be used, such as by a simple notch filters with analog circuits, phase-lock loop technologies, or through the use of frequency-to-voltage converters.

The intermediate frequency signal 410 is plotted where frequency (kHz) 402 is a function of amplitude 404, e.g., the amplitude is in volts or any other suitable unit. In one embodiment, the graph 400 shows the dominant amplitude 420 of the intermediate frequency signal 410 at 1 KHz as well as higher frequency noise 430 on the output at, for example, 8 KHz.

The sharp spike in amplitude 420 of the intermediate frequency signal 410 around the 1 kHz range is due to crosstalk in the mixer (FIG. 1, 112) and is sometimes referred to as parasitic amplitude modulation (PAM). Crosstalk is a disturbance, caused by electromagnetic interference, along a circuit or a cable pair. For example, a telecommunication signal can disrupt a signal in an adjacent circuit and thus causes the signals to become confused and cross over each other. Typically, this crosstalk signal is filtered out of the processed signal or intermediate frequency signal 410 since it does not contain any useful ranging information. However, in one possible embodiment, the amplitude changes in the intermediate frequency signal 410 are used for detecting objects close to the radar antenna, which are too close for ranging.

Figure 5:
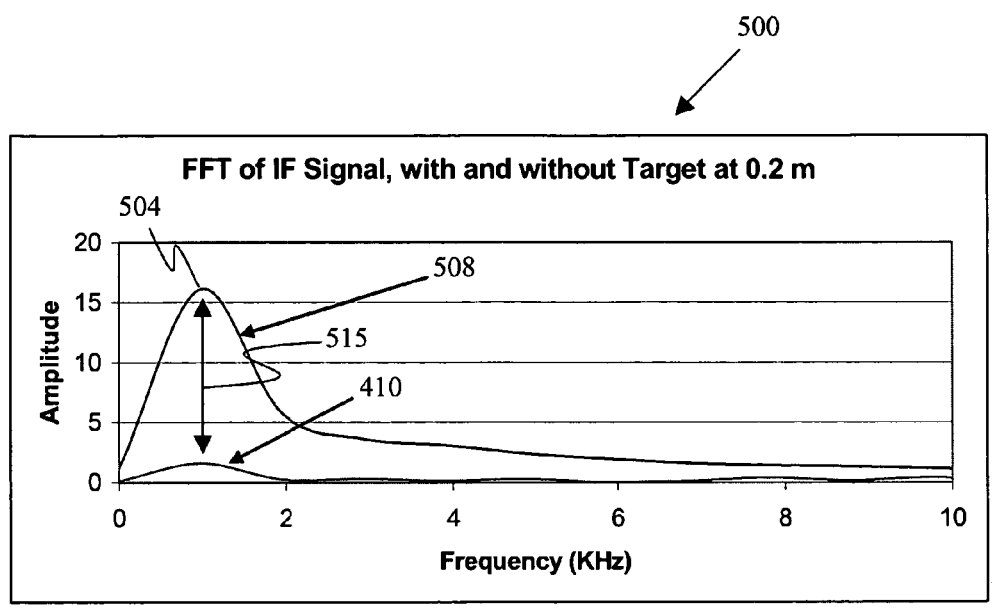
FIG. 5 is a graph illustrating one possible embodiment of using an intermediate frequency to detect an object in the near-field according to the present disclosure.

FIG. 5 is a graph 500 illustrating one possible embodiment of using an intermediate frequency to detect an object in the near-field according to the present disclosure. In FIG. 5, an object (FIG. 1, 150), such as a metal plate, is placed in the near-field path of the transmit frequency (FIG. 1, 108). The graph shows a very large increase 504, approximately one order of magnitude, in the amplitude of the intermediate frequency 508 caused by positioning the metal plate in the near-field of the radar system (FIG. 1, 100). The increase in the amplitude of the intermediate frequency 508 is a result of the impedance mismatch from the metal plate that, in turn, causes instability in the VCO (FIG. 1, 104). This phenomenon is sometimes referred to as load pulling or frequency pulling.

As will be discussed in more detail along with the following drawings, the impedance mismatch causes a VCO output signal (e.g., FIG. 1, 113) to have a greater amplitude as opposed to a VCO signal that has not detected an object in its transmitting path. This change in amplitude 515 between the intermediate frequency 508 caused by the metal plate and the intermediate frequency (FIG. 4, 410) where no object is present, is used for the detection of objects in the near-field of the FMCW radar system according to the present disclosure.

As also will be discussed in the following embodiments of FMCW radar systems, the change in intermediate frequency 508 is easily detectable through a number of ways including spectrum analysis via Fourier Transforms (FT). However, the invention is not limited to this detection technique and any suitable technique can be used, such as by simple notch filters with analog circuits, phase-lock loop technologies, and through the use of frequency-to-voltage converters or the like.

Figure 6:
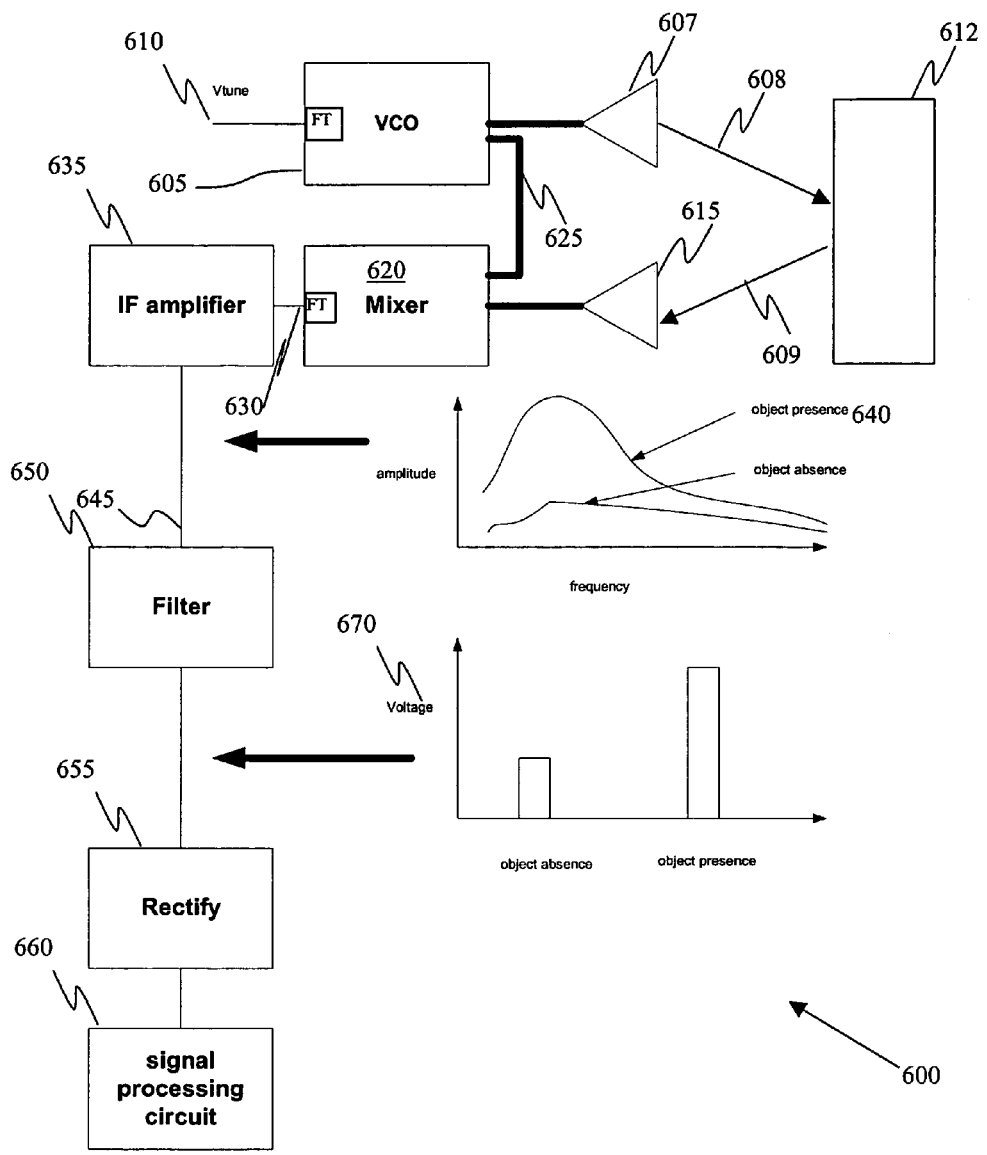
FIG. 6 illustrates one example of a proximity-sensing device for detecting the presence of close-range objects according to the present disclosure.

FIG. 6 illustrates one example of a proximity-sensing device 600 for detecting the presence of close-range objects according to the present disclosure. The proximity-sensing device 600, or FMCW radar device, includes radar module 605 that includes a VCO transceiver. The radar module 605 can include two independent outputs, I (Inphase) and Q (Quadrature), power and ground pins, and a frequency tuning (FT) pin. The FT pin provides a minimum and maximum modulation frequency (maximum allowed tuning frequency). The radar module 605 also provides a tuning slope. However, the embodiment is not limited to this radar module and any suitable radar module can be used.

The radar module 605 is connected to a waveform generator 610 for generating a waveform, such as a triangle or sawtooth waveform. When a voltage level from the waveform generator 610 is applied to the frequency tuning pin FT of the radar module 605, the voltage level causes a transmit frequency to shift around a center frequency and linearly increases from the center frequency.

The output of the radar module 605 produces periodic, swept RF emission 608 through transmit antenna 607. The frequency of this period sweeping is called the carrier frequency 640. Reflected RF energy 609 from an object 612 is collected in the receive antenna 615 and mixed in a mixer device 620 with a portion of the signal 625 transmitted by the radar module 605 (VCO). The mixer device generates a difference signal called an intermediate frequency (IF) signal 630. The intermediate frequency 630 leaving the mixer device 630 is then amplified by an IF amplifier 635 to produce an amplified intermediate signal 645. If an object 612 is sufficiently close to the system, the magnitude of the carrier frequency 640 will increase relative to other frequencies in the amplified IF signal 645.

The amplified IF signal 645 is then filtered by, but not limited to, an analog or digital filter device 650 to pass the carrier frequency 640 of the radar module 605. The carrier frequency 640 is then rectified by a rectifier 655 and transmitted into a signal processing circuit 660, which determines whether an object 612 is present by comparing a rectified signal level 670 to a predetermined threshold.

Figure 7:
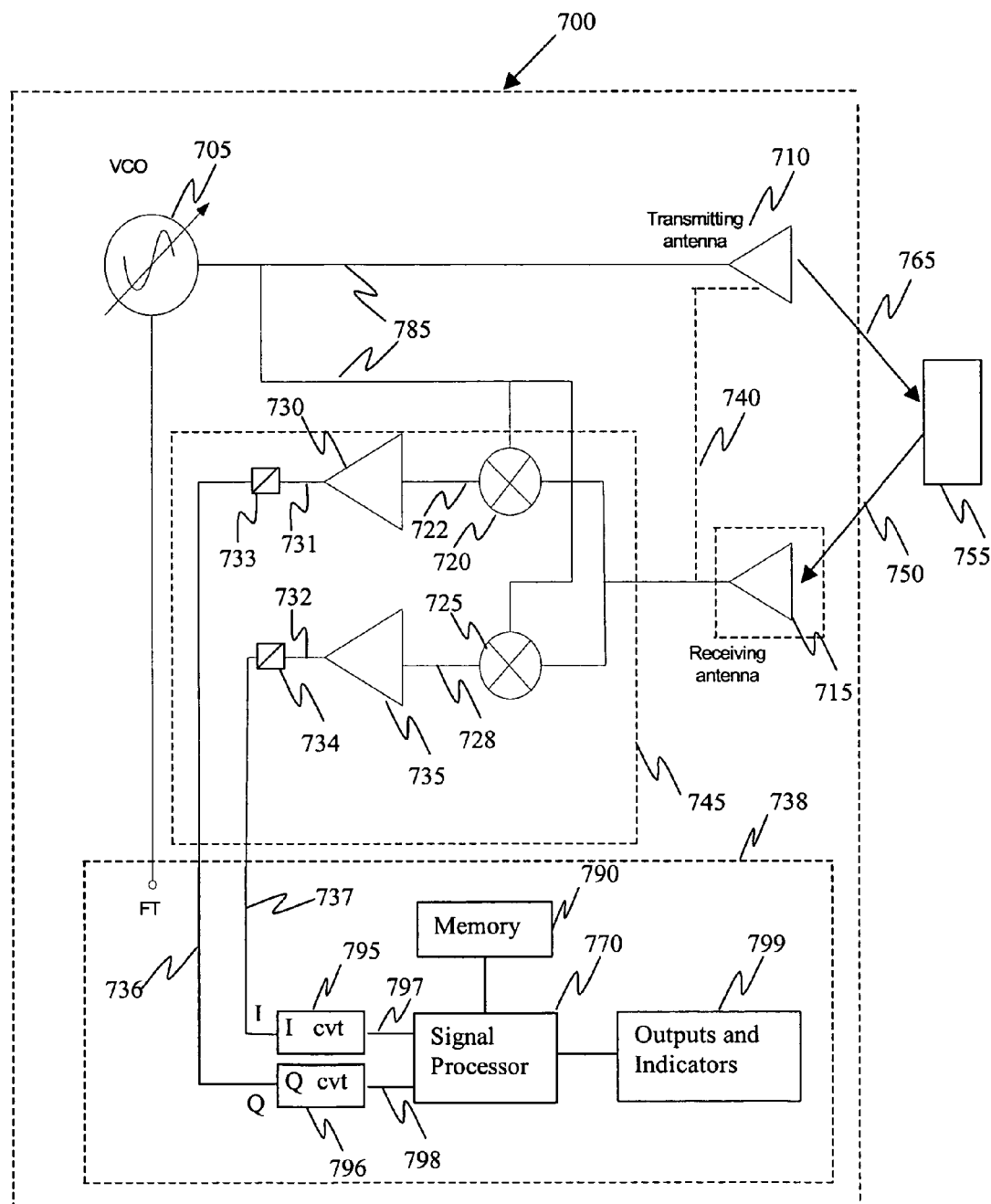
FIG. 7 illustrates another possible embodiment of a proximity-sensing device for detecting the presence of close-range objects.

FIG. 7 illustrates another possible embodiment of a proximity-sensing device 700 for detecting the presence of close-range objects. The proximity-sensing device 700 includes a VCO 705, a transmitting antenna 710, a receiving antenna 715, a first mixer 720, a second mixer 725, a first RF amplifier 730, and a second RF amplifier 735 and a first and second analog-to-digital converter 733, 734, respectively. In addition, the device 700 includes a data processing unit 738. In an alternative embodiment, the receiving antenna 715 could be part of, or coupled to, the transmitting antenna 710 as depicted by the dashed lines 740.

The first mixer 720 is capable of generating a first intermediate frequency output signal Q (Quadrature) via the first analog-to-digital converter 733. The second mixer 725 is capable of generating a second intermediate frequency output signal I (Inphase) via the second analog-to-digital converter 734. In general, a receiver section 745 measures both the inphase (I) and quadrature (Q: out-of-phase) components from received signal 750.

In one embodiment, the sensed movement between the proximity-sensing device 700 and an object 755 in a far-field is calculated. As the object 755 moves away from the sensor 700, an output frequency change is detected. In one example of this embodiment, the maximum modulation frequency (maximum allowed tuning frequency) provided at FT is equal to or less than 150 kHz. FT can be connected to, but not limited to, a triangle waveform or sawtooth waveform generator. The tuning slope is 50 MHz per volt and the minimum and maximum tuning voltages are 0.5V and 10V respectively. The transmitted frequency 765 is centered at 24.125 GHz. When a voltage level is applied to FT, it causes the transmit frequency 765 shift around the center frequency.

Accordingly, the first mixer 720 generates the first intermediate frequency output signal 722 for the Q component of the receive signal 750. The second mixer 725 generates a second intermediate frequency output signal 728 for the I component of the receive signal 750. However, in some cases, the strength of the first and second intermediate frequency output signals 722, 728 measured at the outputs of the mixers 720, 725 are too small to be processed electronically. Therefore, the first and second intermediate frequency output signals 722, 728 have to be amplified by the first and second amplifiers 730, 735, respectively, as discussed above. After amplification, the signals 731, 732 are converted with respective analog-to-digital converters 733, 734. The resulting signals 736, 737 can be converted into voltage levels by the data processing unit 738 according to the frequency of the resulting signals 736, 737. The higher the frequency, the bigger the voltage level.

To detect targets located in the near-field of system 700 where the frequency is not modulated enough to be distinguishable, a signal processing unit 770 is used to compare changes in amplitudes (FIG. 5, 515). More specifically, an object 755 induces an impedance mismatch in the radar system 700 when it enters the transmission path of the transmitted signal 765. Some energy emitted by the transmitting antenna 710 will reflect back to the source, or VCO 705. Different amounts of energy will be reflected back depending on the frequency of the energy. The change in impedance as seen by an output 785 of the VCO 705 can induce changes in the DC voltages across junctions of active devices in the VCO 705, hence, affecting the amplitude and stability of at least the VCO 705 and the VCO output signal 785.

When the VCO 705 is affected, the amplitude of the VCO output signal 785 is seen as a very large increase (FIG. 5, 504), approximately one order of magnitude, in the first and second intermediate frequencies 722, 728. The increase in the amplitude of the first and second intermediate frequencies 722, 728 is detected and compared to preset or predetermined intermediate signals generated at some earlier time and stored in memory 790. However, the invention is not limited to a stored predetermined intermediate signal, and the predetermined intermediate signal can be generated in real time. The preset or predetermined intermediate signals are generated by the proximity sensor 700 in an environment where objects are not in the transmitting path (FIG. 4, 410).

For example, a predetermined intermediate signal can be generated in a training session of the FMCW radar system 700 in which the transmitting antenna 710 is pointed into an area where there are no obstructions, such as the sky. The system 700 then generates the intermediate signal and stores its respective predetermined intermediate signal location in the memory 790.

In one embodiment, the resulting converted signals 736, 737 are detected and converted into the frequency domain by spectrum analysis via Fourier Transforms (FT) using a quadrature (Q) conversion unit 796 and an inphase (I) conversion unit 795, respectively. Finally, the spectral content of the Q and I output signals 798, 797 are compared to the predetermined intermediate signal in the signal processor 770. If a difference in amplitude between the output signals 798, 797 and predetermined intermediate signals are detected, the output and indicator unit 799 provides an indication of detection of the object in the near-field.

Figure 8:
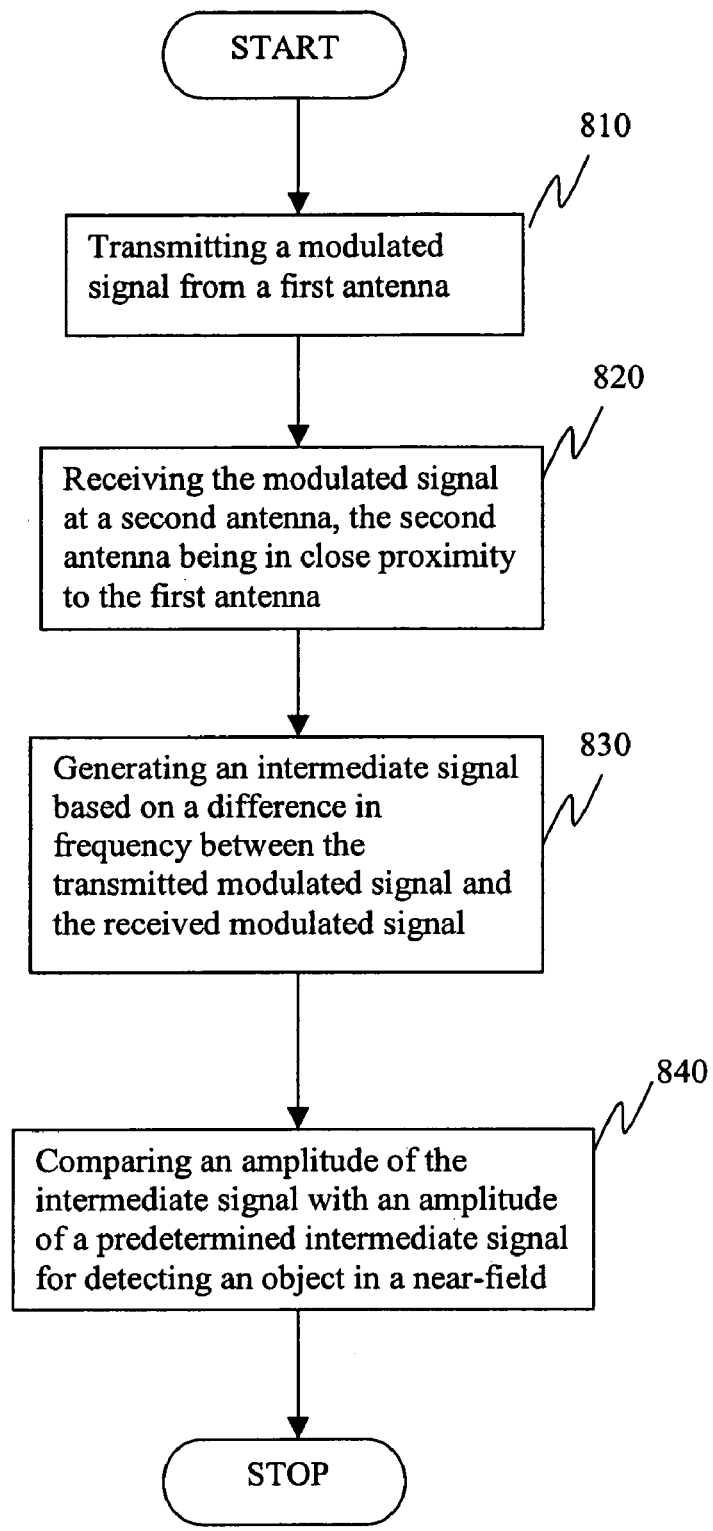
FIG. 8 is a flow chart illustrating the detection of an object in the near-field using a frequency modulate continuous wave radar system.

FIG. 8 is a flow chart 800 illustrating the detection of an object in the near-field using a frequency modulate continuous wave radar system. In one embodiment, a signal is transmitted from a first antenna 810. The frequency of the transmitted signal is modulated by certain waveform, e.g., a tuning voltage that controls the internal voltage-control-oscillator (VCO) inside the radar system. A second antenna, in close proximity to the first antenna, receives the modulated signal 820. The received signal is mixed with the transmitted signal and an intermediate frequency(s) is generated that represents the distance information between a sensed object and the antenna surface. The intermediate signal is based on a difference in frequency between the transmitted signal and the received signal 830.

At least one output from the radar system contains distance information in the frequency format. In one embodiment, the distance information is obtained by comparing an amplitude of the intermediate signal with an amplitude of a predetermined intermediate signal for detecting an object in a near-field 840. In another embodiment, the intermediate signal is amplified and converted into a voltage level that is proportional to its frequency with our external circuitry. Then, for example, a standard voltage comparator is used to process and compare the converted voltage against a preset voltage that represents a sensing point.

While the disclosure has been described with respect to several possible embodiments involving the detection of objects in the near-field of a radar system using the change in amplitude of the intermediate frequency, it will be appreciated that other embodiments are possible. These embodiments include applications in many commercial and industrial settings, such as: detection of vehicles in a drive-through food restaurant where inductive loop sensors or ultrasonic sensors are currently used; the detection of objects on an automated assembly line where inductive proximity sensors would typically be used, wherein the disadvantage of inductive proximity sensors is their relative short range; the level detection of liquid in a storage vessel where mechanical float switches that require maintenance are typically used; the detection of humans entering a restricted area; and the detection of cargo in shipping containers.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The claimed invention is:

1. A method for detecting an object in the near-field of a frequency modulated continuous wave radar system, the method comprising:
    transmitting a modulated signal from a first antenna;
    receiving the modulated signal at a second antenna, the second antenna being in close proximity to the first antenna;
    generating an intermediate signal based on a difference in frequency between the transmitted modulated signal and the received modulated signal; and
    comparing an amplitude of the intermediate signal with an amplitude of a predetermined intermediate signal for detecting an object in a near-field.

2. The method of claim 1, wherein comparing the amplitude of the intermediate signal with the amplitude of the predetermined intermediate signal further comprises detecting a change in amplitude between the intermediate signal and the predetermined intermediate signal with respect to a carrier frequency.

3. The method of claim 2, wherein detecting the change in amplitude further comprises detecting that the amplitude of the intermediate signal is greater than the amplitude of the predetermined intermediate.

4. The method of claim 2, wherein detecting the change in amplitude further comprises converting the intermediate signal into a frequency domain before detecting a change in amplitude between the intermediate signal and the predetermined intermediate signal.

5. The method of claim 1, wherein comparing the amplitude of the intermediate signal with an amplitude of the predetermined intermediate signal further comprises comparing the amplitudes of the intermediate signal and the predetermined intermediate signal at a predetermined frequency.

6. The method of claim 5 further comprising determining the predetermined intermediate signal based on a modulation frequency of a voltage-controlled oscillator.

7. The method of claim 1 further comprising:
    converting the amplitude of the intermediate signal into a voltage level that is proportional to the amplitude of the intermediate signal; and
    comparing the voltage level with a preset voltage level.

8. The method of claim 1 further comprising generating the predetermined intermediate signal by:
    transmitting the modulated signal from a first antenna into an environment where no obstructions are present;
    measuring a signal at the output of a mixer; and
    storing the measured signal as the predetermined intermediate signal in a memory location.

9. The method of claim 1, wherein detecting the object in the near-field further comprises detecting the object in the near-field of the first and second antenna, the near-field being based on a modulation frequency of a voltage-controlled oscillator.

10. The method of claim 1, wherein transmitting the modulated signal further comprises transmitting a carrier signal frequency modulated by a periodic waveform.

11. A frequency modulated continuous wave radar module for detecting objects in the near-field, the system comprising:
    a first antenna for transmitting a modulated signal;

a second antenna for receiving the modulated signal, the second antenna being in close proximity to the first antenna;

at least one mixer coupled to the first and second antennas for generating an intermediate signal based on a difference in frequency between the transmitted modulated signal and the received modulated signal; and a processor coupled to the mixer for comparing an amplitude of the intermediate signal with an amplitude of a predetermined intermediate signal for detecting an object in a near-field.

12. The module of claim 11, wherein the processor further comprises a comparator for detecting a change in the amplitude between the intermediate signal and the predetermined intermediate signal with respect to a carrier frequency.

13. The module of claim 12, wherein the comparator compares the amplitudes of the intermediate signal and the predetermined intermediate signal at a predetermined frequency.

14. The module of claim 11 further comprising a voltage-controlled oscillator coupled to the first antenna and the at least one mixer, for generating a repeating waveform.

15. The module of claim 14 further comprising a waveform generator coupled to the voltage-controlled oscillator for modulating the frequency of a voltage-controlled oscillator.

16. The module of claim 11 further comprising a memory for storing the predetermined intermediate signal.

17. The module of claim 11, wherein the at least one mixer further comprises a first mixer for generating and inphase signal and a second mixer for generating a quadrature signal, the inphase and quadrature signals being processed by the processor.

18. The module of claim 11, wherein the first antenna and the second antenna are a single antenna.

19. The module of claim 11 further comprising at least one amplifier coupled to the at least one mixer for amplifying the intermediate signal.

20. The module of claim 19 further comprising an analog-to-digital converter coupled to the at least one amplifier.

21. The module of claim 20 further comprising a frequency converter coupled to the analog-to-digital converter for converting inphase and quadrature signals into a frequency domain.

22. A proximity sensor for use in detecting objects in a near-field, the sensor comprising:

a housing; and a circuit enclosed within the housing, the circuit including:

a first antenna for transmitting a modulated signal;

a second antenna for receiving the modulated signal, the second antenna being in close proximity to the first antenna;

at least one mixer coupled to the first and second antennas for generating an intermediate signal based on a difference in frequency between the transmitted modulated signal and the received modulated signal; and a processor coupled to the mixer for comparing an amplitude of the intermediate signal with an amplitude of a predetermined intermediate signal for detecting an object in a near-field.

23. The sensor of claim 22, wherein the housing is plastic.

24. The sensor of claim 22, wherein the processor further comprises a comparator for detecting a change in the amplitude between the intermediate signal and the predetermined intermediate signal with respect to a carrier frequency.

25. The sensor of claim 24, wherein the comparator compares the amplitude of the intermediate signal and the predetermined intermediate signal at a predetermined frequency.

* * * * *

UNITED STATES PATENT AND TRADEMARK OFFICE
CERTIFICATE OF CORRECTION

PATENT NO.         : 7,379,013 B2                                         Page 1 of 1
APPLICATION NO. : 11/244246
DATED              : May 27, 2008
INVENTOR(S)        : Michael Dean and Haozhe Dong It is certified that error appears in the above-identified patent and that said Letters Patent is hereby corrected as shown below:

Column 11, line 30, "and inphase signal" should read -- an inphase signal --

Signed and Sealed this

Twenty-fifth Day of November, 2008

JON W. DUDAS
*Director of the United States Patent and Trademark Office*